(No Model.)

J. F. FRENCH.
BUCK SAW.

No. 281,627. Patented July 17, 1883.

WITNESSES:
James F. Tobin
Harry Drury

INVENTOR:
Josiah F. French
By his Attorneys
Howson and Son

N. PETERS, Photo-Lithographer, Washington, D. C.

UNITED STATES PATENT OFFICE.

JOSIAH F. FRENCH, OF PHILADELPHIA, PENNSYLVANIA, ASSIGNOR OF ONE-HALF TO THE J. BARTON SMITH COMPANY, OF SAME PLACE.

BUCK-SAW.

SPECIFICATION forming part of Letters Patent No. 281,627, dated July 17, 1883.

Application filed April 16, 1883. (No model.)

*To all whom it may concern:*

Be it known that I, JOSIAH F. FRENCH, a resident of Philadelphia, Pennsylvania, and a citizen of the United States, have invented certain Improvements in Buck-Saws, of which the following is a specification.

My invention consists of an improvement, fully described hereinafter, in that part of a buck-saw where the braces meet.

Figure 1:
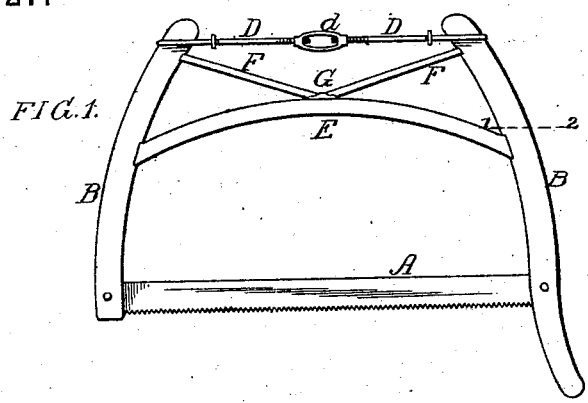
Figure 2:
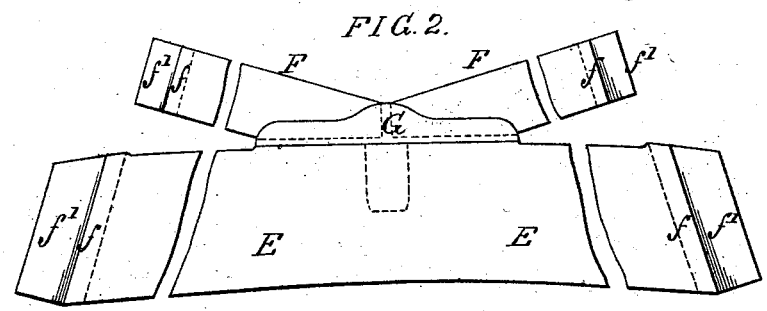
Figure 3:
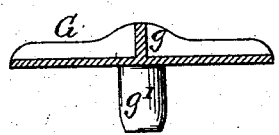
Figure 4:
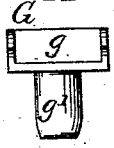
Figure 5:
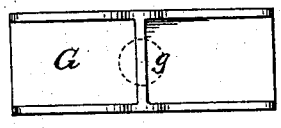
Figure 6:
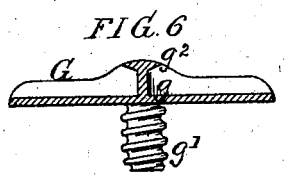
Figure 7:
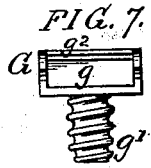
Figure 8:
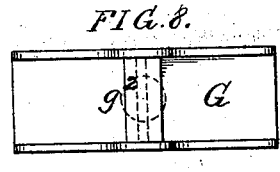
Figure 9:
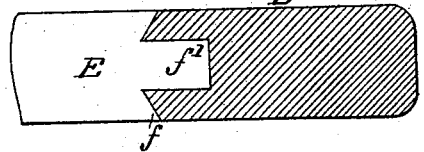

In the accompanying drawings, Figure 1 is a view of the complete saw; Fig. 2, an enlarged view of portions of the braces; Figs. 3, 4, and 5, views of one form of my improved brace-block; Figs. 6, 7, and 8, similar views of another form; Fig. 9, an enlarged sectional view on the line 1 2, Fig. 1.

Referring to Fig. 1, A is the saw-blade; B B, the curved side bars, one of which is provided with an extension and used as a handle; and D is the usual tie-rod provided with loops fitting over the upper ends of the bars B. This tie-rod is also provided with a screw-coupling, $d$, by turning which the upper ends of the bars B may be brought closer together, and the saw put under tension against the action of the braces E and F F, which have tenons fitting into mortises in the side bars. I prefer to make the brace E of the curved form shown in Fig. 1, and I combine with it and the braces F F a brace-block, G, which is secured to the center of the brace E, and is provided with side flanges and a central rib, $g$, thus forming pockets for the reception of the adjoining ends of the braces F, as a means of securing the block G to the brace E to form a peg, $g'$, on its under side, which peg may be plain, as shown in Figs. 3 and 4, or screwed, as in Figs. 6 and 7, and fitted into a corresponding opening in the brace E. The brace-block, including its side flanges, transverse rib, and peg, is cast in one piece on the block. The rib $g$ may be provided with flanges $g^2$, as shown in Figs. 6, 7, and 8, to form more secure pockets for the ends of the braces. I bevel the shoulders for the outer ends of the braces F F and E, so as to fit the beveled edges of the bars B, as shown in Fig. 9. With this construction, when the saw is put under tension by screwing up the coupling $d$ of the tie-rod, all the parts of the saw-frame will be kept rigid and straight and prevented from twisting or warping.

I claim as my invention—

The combination of the braces E and F of a buck-saw with a block, G, on which are cast a transverse rib, $g$, side flanges, and peg $g'$, as set forth.

In testimony whereof I have signed my name to this specification in the presence of two subscribing witnesses.

J. F. FRENCH.

Witnesses:
 HARRY L. ASHENFELTER,
 HUBERT HOWSON.